(12) United States Patent
Hoile et al.

(10) Patent No.: US 7,779,073 B2
(45) Date of Patent: Aug. 17, 2010

(54) COMPUTER NETWORK

(75) Inventors: Cefn R Hoile, Ipswich (GB); Nicholas J Kings, Ipswich (GB); Nicholas J Davies, Colchester (GB)

(73) Assignee: BRITISH TELECOMMUNICATIONS plc, London (GB)

( * ) Notice: Subject to any disclaimer, the term of this patent is extended or adjusted under 35 U.S.C. 154(b) by 209 days.

(21) Appl. No.: 11/886,735

(22) PCT Filed: Mar. 10, 2006

(86) PCT No.: PCT/GB2006/000857

§ 371 (c)(1),
(2), (4) Date: Sep. 20, 2007

(87) PCT Pub. No.: WO2006/103388

PCT Pub. Date: Oct. 5, 2006

(65) Prior Publication Data

US 2009/0037566 A1 Feb. 5, 2009

(30) Foreign Application Priority Data

Mar. 31, 2005 (EP) .................................. 05252033

(51) Int. Cl.
*G06F 15/13* (2006.01)
(52) U.S. Cl. ....................... 709/204; 709/203; 709/207; 709/216; 709/224; 709/226; 707/3
(58) Field of Classification Search ................. 709/203, 709/204, 207, 216, 224, 226; 707/3
See application file for complete search history.

(56) References Cited

U.S. PATENT DOCUMENTS

| 6,041,311 | A | | 3/2000 | Chislenko et al. |
| 6,480,885 | B1 | * | 11/2002 | Olivier ....................... 709/207 |
| 6,493,703 | B1 | * | 12/2002 | Knight et al. .................. 707/3 |
| 6,981,040 | B1 | * | 12/2005 | Konig et al. ................. 709/224 |
| 2003/0191828 | A1 | | 10/2003 | Ramanathan et al. |
| 2006/0004600 | A1 | * | 1/2006 | Summer et al. ................. 705/1 |
| 2006/0234631 | A1 | * | 10/2006 | Dieguez .................... 455/41.2 |
| 2006/0242227 | A1 | * | 10/2006 | Rao et al. ................... 709/203 |
| 2008/0162397 | A1 | * | 7/2008 | Zaltzman ..................... 706/48 |

FOREIGN PATENT DOCUMENTS

WO WO 2004/017226 A2 2/2004

OTHER PUBLICATIONS

Extended European Search Report dated Aug. 8, 2005 in EP 05252033.
Payton D. et al., "Dynamic Collaborator Discovery in Information Intensive Environments," ACM Computing Surveys, ACM, New York, U.S., vol. 31, No. 2ES, 1999, pp. 1-8, XP002169231.

(Continued)

*Primary Examiner*—Jinsong Hu
(74) *Attorney, Agent, or Firm*—Nixon & Vanderhye PC

(57) ABSTRACT

In a network of computers, e.g. the internet, each computer records the information sources it accesses, and these records are used to identify computers whose users share common interests, as indicated by the sources they access. A virtual network is created linking computers whose users have been identified as sharing similar interests data on what sources have been accessed by each user are shared with neighbouring computers, a defined by the virtual network. Computers can also pass on information on sources accessed received from one neighbour to other neighbours.

24 Claims, 9 Drawing Sheets

OTHER PUBLICATIONS

David M. Nichols, "Implicit Rating and Filtering," Proc. 5$^{th}$ Delos Workshop on Filtering and Collaborative Filtering, Budapest, Hungary, Nov. 10-12, 1997, ERCIM, 'Online! 1998, pp. 31-36, XP002339787, ISBN 2-912335-04-3.

White, R. W., et al. "An implicit feedback approach for interactive information retrieval," Information Processing & Management, vol. 42, Issue 1, Jan. 2006, pp. 166-190.

"Slashdot": http://slashdot.org/faq/slashmeta.shtml.

Crossley M., et al., "Profiles—analysis and behaviour," BT Technology Journal, vol. 21, No. 1, Jan. 2003, pp. 56-66.

"Semantic Blogging for Bibliography Management": http://www.hpl.hp.com/cgi-bin/pf.cgi.

"HP Labs Semantic Web Research": http://www.hpl.hp.com/cgi-bin/pf.cgi.

"Introduction to Semantic Web Technologies": http://www.hpl.hp.com/cgi-bin/pdf.cgi.

Kautz, H., et al., "The Hidden Web," American Association for Artificial Intelligence, AI Magazine, Summer 1997, pp. 27-36.

ISR mailed May 17, 2006 in PCT/GB2006/000857.

\* cited by examiner

| Node ID 24 |
|---|
| 25 network address<br>26 network address<br>27 network address |

| Node ID 43 |
|---|
| 35 network address<br>38 network address |

| Node ID 26 |
|---|
| 24 network address<br>29 network address |

COMPUTER NETWORK

This application is the US national phase of international application PCT/GB2006/000857 filed 10 Mar. 2006 which designated the U.S. and claims benefit of EP 05252033.5, dated 31 Mar. 2005, the entire content of which is hereby incorporated by reference.

BACKGROUND

1. Technical Field

The present invention relates to a computer network and method for sharing data.

2. Related Art

Improvements in communications technology and data storage capacity have resulted in a situation where it has become relatively inexpensive to provide access to information. As computer speeds and access bandwidths increase, so the amount of data accessible in a short period of time rapidly becomes unmanageable, e.g., when a simple query results in tens of thousands of "hits". As a result, network users have increasingly resorted to selecting information sources that are known to share their interest and, ideally, can be tailored to a perfect match. However, given the sheer volume of information available, it is practically impossible for a user to know about every source that could be of interest.

BRIEF SUMMARY

The present invention seeks to provide a method and means of enabling a computer user in a network to readily obtain access to relevant sources of information known to other users in the network but that the user was not aware of.

The present invention provides a network as set out in claim 1. The present invention also provides a method as set out in claim 13.

BRIEF DESCRIPTION OF THE DRAWINGS

Embodiments of the invention will now be described by way of example with reference to the drawings in which.

DETAILED DESCRIPTION OF EXEMPLARY EMBODIMENTS

Figure 1:
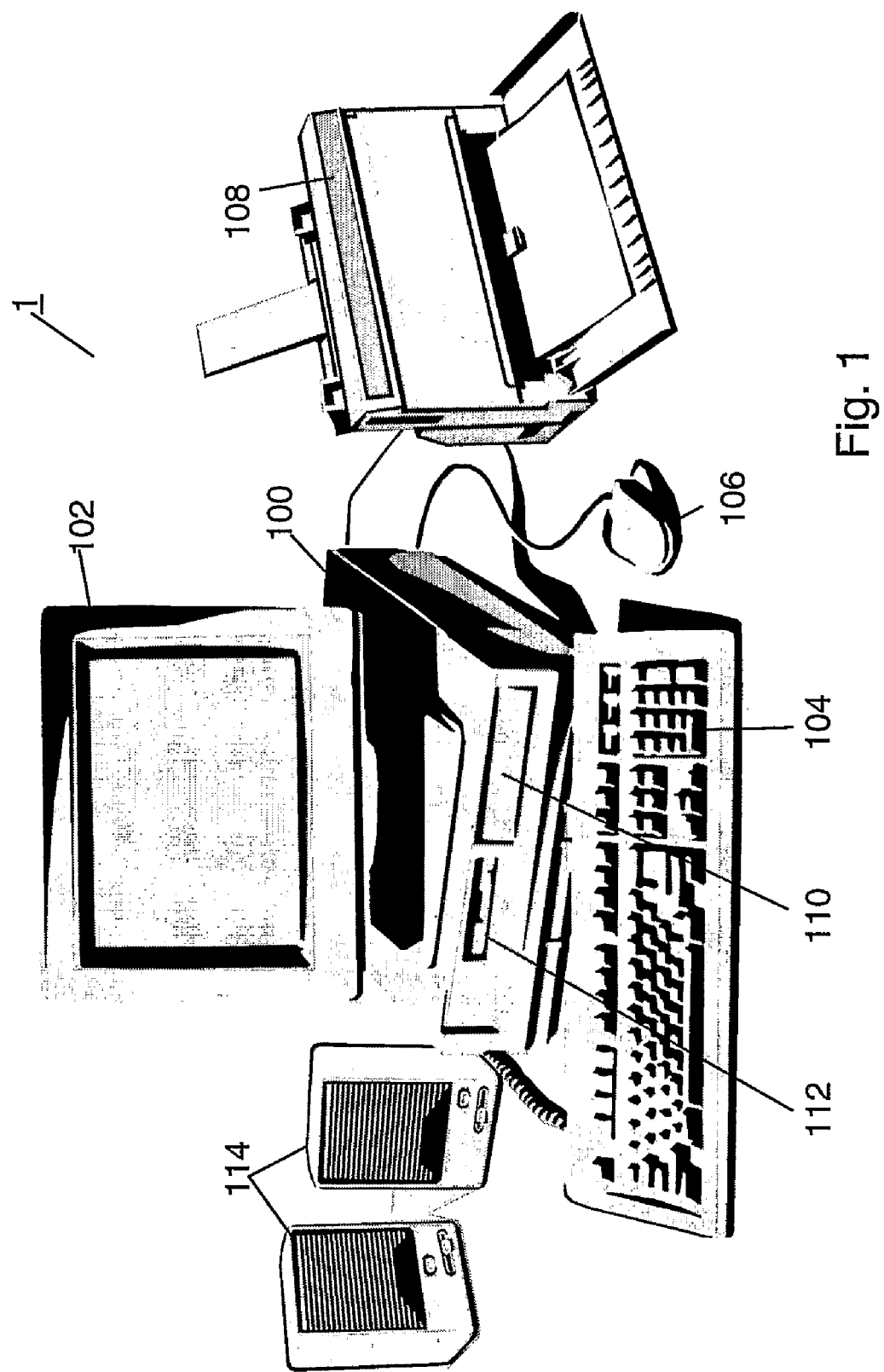
FIGS. 1 and 2 show a conventional computer system adapted to implement exemplary embodiments.

FIG. 1 shows a general-purpose computer system forming part of a distributed computing environment that provides the operating environment of embodiments of the present invention. Later, the operation of the embodiments of the present invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within distributed computing environments comprising computer systems other than that shown in FIG. 1, and in particular hand held devices, notebook computers, main frame computers, mini computers, multi processor systems, etc. Within a distributed computing environment, multiple computer systems are connected to a communications network and individual program modules of the invention may be distributed amongst the computer systems.

With specific reference to FIG. 1, a general purpose computer system 1, hereinafter referred to as a computer, forming part of the operating environment of an embodiment of an invention, and which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 1 illustrates an exemplary embodiment only, and that other configurations of computers are possible which can be used with the present invention. In particular, the base chassis unit 100 may be in a tower configuration, or alternatively the computer 1 may be portable in that it is embodied in a laptop or notebook configuration. Other configurations such as personal digital assistants or even mobile phones may also be possible.

Figure 2:
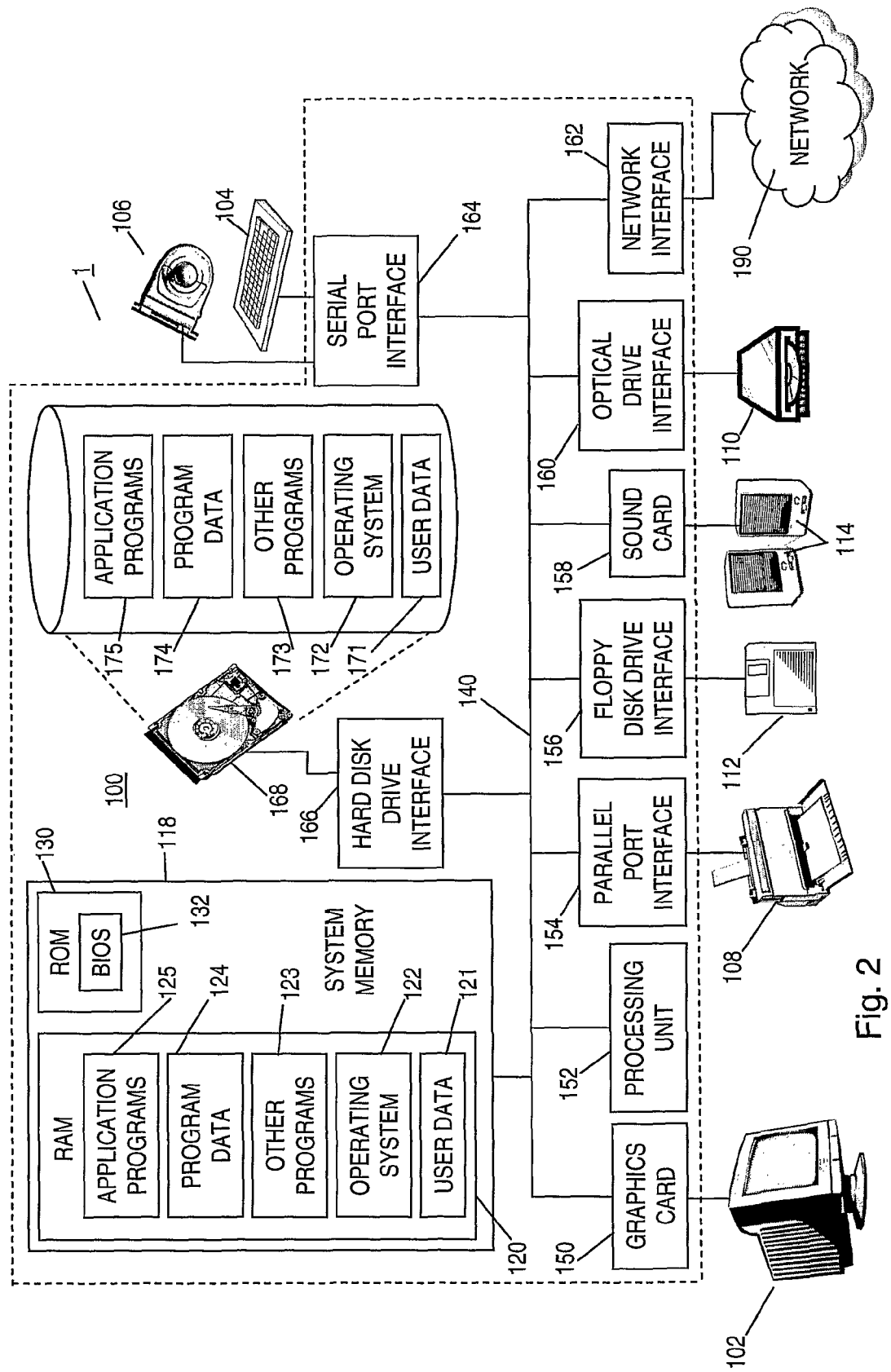

FIG. 2 shows a system block diagram of the system components of the computer 1. Those system components located within the dotted lines are those which would normally be found within the chassis unit 100.

With reference to FIG. 2, the internal components of the computer 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer 1 to communicate with other computers over a network 190. In practice more than one network interface may be provided. The network 190 may be a local area network, wide area network, local wireless network, the public switched telephone network (PSTN) or the like. In particular, IEEE 802.11 wireless LAN networks may be of particular use to allow for mobility of the computer. The network interface 162 allows the computer 1 to form logical connections over the network 190 with other computers such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs 173 required by the computer system 1 or the user, a computer system operating system 172 such as Microsoft® Windows®, Linux™, Unix™, or the like, as well as user data in the form of files, data structures, or other data 171. The hard disk drive 168 provides non-volatile storage of the aforementioned programs and data such that the programs and data can be permanently stored without power. The other programs 173 include a program or programs for implementing methods of or related to the present invention. In a variant, the applications programs 175 contain program or programs for implementing methods of the present invention.

In order for the computer 1 to make use of the application programs or data stored on the hard disk drive 168, or other computer readable storage media, the system memory 118 provides the random access memory 120, which provides memory storage for the application programs, program data, other programs, operating systems, and user data, when required by the computer 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer as required. More particularly, where a program or data is not being used by the computer, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer 1. The BIOS is essential at system start-up, in order to provide basic information as to how the various system elements communicate with each other and allow the system to boot-up.

Whilst FIG. 2 illustrates one embodiment of a computer of a distributed computing environment of the invention, it will be understood by the skilled person that other peripheral devices may be attached to the computer, such as, for example, microphones, joysticks, game pads, scanners, or the like. In addition, with respect to the network interface 162, we have previously described how this is preferably a wireless LAN network card, although equally it should also be understood that the computer 1 may be provided with a modem attached to either of the serial port interface 164 or the parallel port interface 154, and which is arranged to form logical connections from the computer system 1 to other computers via the public switched telephone network (PSTN).

The preferred embodiment is performed in a network of interconnected computers 1 of the Small World Adaptive Network (SWAN) type of network, as described in detail in European Patent Application No. 02801398.5 (Publication No. 1436957) and modified as described below.

Figure 3:
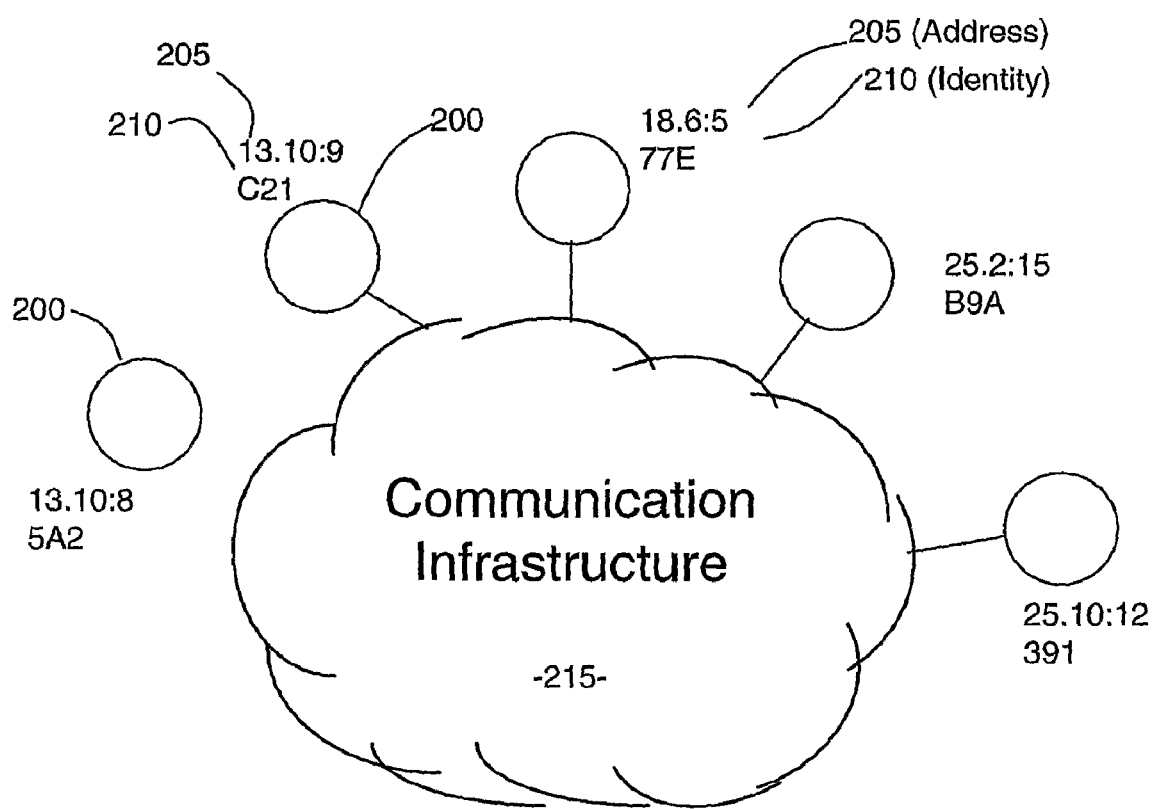
FIG. 3 shows a conventional network adapted to implement exemplary embodiments.

Referring to FIG. 3, a SWAN network comprises a set of nodes 200 connected by a communication infrastructure 215 (e.g. the network 190) comprising computers 1, on which the nodes 200 reside, together with local access networks and the Internet.

The skilled person will understand that the computers 1 constitute computing nodes that have processing, storage and communication capabilities, and also constitute nodes within the communications infrastructure 215 via which messages can be sent between the computers 1.

Each node 200 can be thought of as comprising a two-part data record 202 in which one part 202a constitutes its identity (ID) 210 and the other part 202b constitutes an address 205 in the infrastructure in the form of an Internet Protocol (IP) address including a port number and a service ID. The data record 202 of a node 200 constitutes a published pair of unique identities (UID) UIDp:UIDa, the identity (ID) 210 constituting a publication unique ID (UIDp), and the address 205 constituting an associated unique ID (UIDa). As will be understood from the examples to be described later, the UIDa is commonly in the form of the network address of a retrievable data item on a computer 1, but is not restricted to this and can be in any of a number of other forms.

Each node 200, by virtue of the association with its host computer 1, has access to processing, storage and communication capabilities and is configured to send and receive a set of message types via the infrastructure 215 to any other such node 200 by specifying an address 205 in the infrastructure 215 for the target node. Each computer 1 can have many thousand resident nodes 200.

As will be described in detail later, the node identities 210 are fixed length bit-strings produced by applying a hashing algorithm to practical UIDs, for example URLs and postcodes, and are associated with, inter alia, data items hosted by the computers on which those nodes reside and are available for retrieval by other computers of the network. The term data item is used herein in a broad sense rather than a limited sense, and includes software capable of providing a service, and the term retrieval in this case means that the hosted service is made available to users at remote computers of the network. Other associations will be described later.

Figures 4, 5:
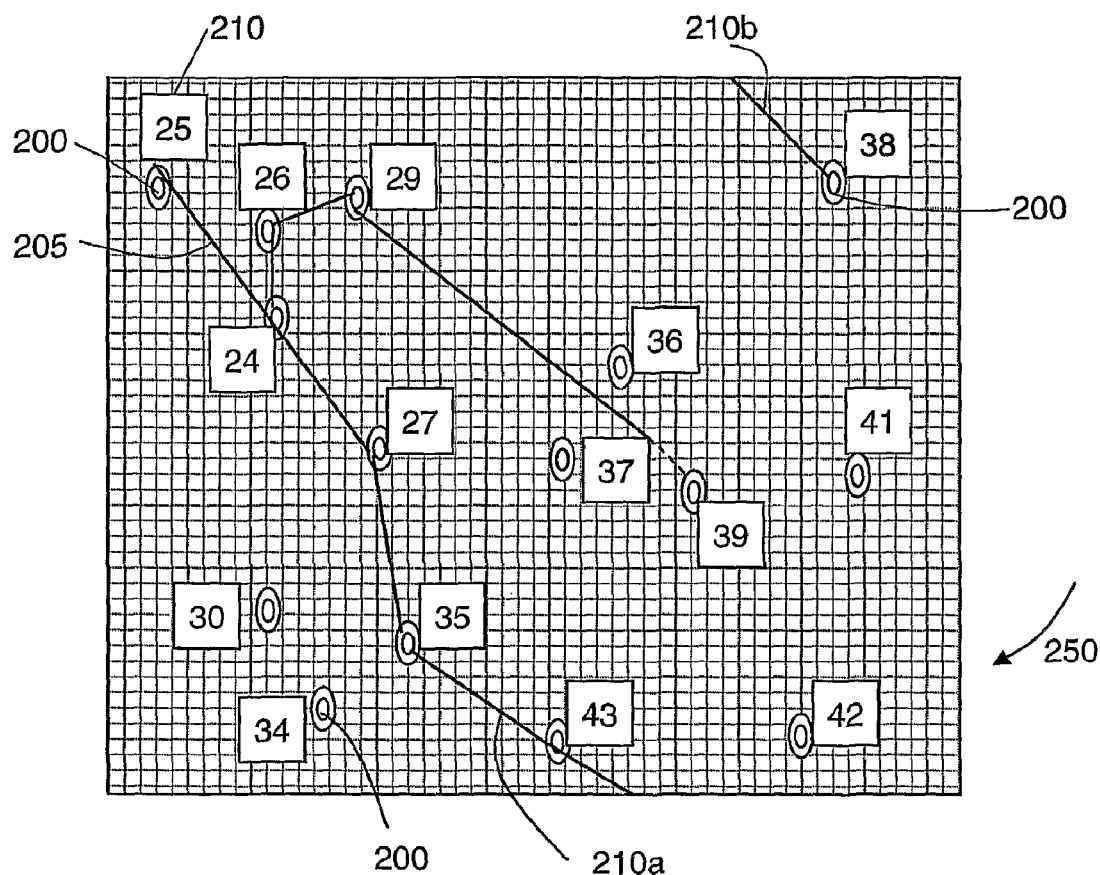
FIG. 4 shows a coordinate space representation of the network of FIG. 3.
FIG. 5 shows node identification for the network of FIG. 3.

As shown in FIG. 4, each node identity 210 is representative of co-ordinates in co-ordinate space, referred to hereafter as ID space 250, which is independent of network address and physical location.

Nodes represented in ID space 250 have two characteristics. Firstly, each node 200 maintains a list containing a few short-range links and a few long-range links, where a link is an alternative term for the network address of another node 200, conveniently but not necessarily in the form of the record 202 of that other node 200. Secondly, there is a predictable relationship (the hashing algorithm) between every node's ID 210 and its co-ordinates in ID space 250.

If a node (the enquiring node) needs to communicate with a node (the target node) for which it has an identity (e.g. supplied by a user in raw UID form, i.e. not hashed) but no address, it uses the hashing algorithm to translate that target node's ID 210 into co-ordinates in ID space 250 and then performs calculations to find which of the nodes in its list (referred to as the "nearest node") is located in ID space nearest to the target node. These calculations comprise first determining its own distance from the target node in ID space, and then the respective distances for each of the nodes in its list. Assuming that the enquiring node now determines that one of its list of nodes is the nearest node, it initiates the transmission, through the infrastructure to that nearest node, of a "FIND" request which contains the target node's ID 210 (now in its fixed length bitstream hashed form), and the ID and network address of the enquiring node.

When a node (in this case, the "nearest node" of the enquiring node's list and now referred to as the receiving node) receives a FIND request, it retrieves the target node's ID 210 from the FIND request and first checks whether there is a match between its own ID and the target node's ID. If there is no match, it then proceeds to find its respective "nearest node", performing calculations as described above for the enquiring node. Thus, the FIND message is passed onwards in the same manner, always to a receiving node whose ID co-ordinates represent a location in ID space which is nearer to the location of the target node's ID in ID space than that of the forwarding receiving node.

At some point, the propagation of the FIND request will finish at a node (referred to as the final node) which either (1) has an ID matching the target node's ID, or (2) is not able to find in its list a "nearest node". Since the FIND request contains the ID and network address of the enquiring node, that final node can now return to the enquiring node over the infrastructure 215 a "FOUND" message containing its own ID and network address, i.e. its data record part 202b, and the target node's ID. The enquiring node can now determine whether that final node is the desired target node, and if so direct communication can subsequently take place using the routing mechanisms of the infrastructure 215.

The set of message types includes PUSH and PULL updating messages which are initiated by nodes periodically to improve the identity network. The updating of the SWAN network is not relevant to the present invention and the updating messages will not be described further.

The basic structure of the SWAN network as described above enables a user (the enquiring user) at a computer 1 to find out whether the network includes a node (the target node) having an ID of interest to that user, and, if so, to obtain a network address relating to that ID and which the user can employ as a destination address for messages. The user might submit that ID, via a search interface, to a SWAN network node resident on his computer 1, and that node will then perform as the enquiring node described above. In a variant embodiment, the user's computer 1 is arranged to generate a hashed ID and send a FIND message via the infrastructure 215. In this case, the "From" field of the FIND message contains a network address of the computer, instead of containing a node ID.

Reference to Networker

A feature of the invention is the construction of a network in which users with common interests are located close to each other. In order to achieve this it is necessary to establish the interests of each user and to construct a (virtual) network that links users with common interests. One way of achieving this, according to an embodiment of the present invention, is by using the Networker program. DIET is a facility for hosting very large numbers of interacting services in a decentralised network. As such it is a means of deploying Networker, which contributes to defining links between people according to the things they read in common. This functionality is achieved by services hosted on each machine talking to each other. DIET is an acronym for Decentralised Information Ecosystem Technologies. It is a European collaborative research project established under the Universal Information Ecosystems initiative [FET 1999] of the European Union. Details of DIET may be found via http://diet-agents.sourceforge.net.

Essentially Networker allows for imports of data or probes in the user's computing environment to determine what the user's reading behaviour is, a scheme for defining unique identifiers against articles which are read and a decentralised lookup system to find other users which have read the same thing.

The Networker program comprises a set of data handling processes, including, inter alia, a publishing process, a searching process, a page retrieval process, a call maker process.

Upon installation, the Networker program installs a set of pre-defined software probes on the user's computer 1. Each pre-defined software probe operates in accordance with a respective predefined detection criterion (also referred to as a template), e.g. proper names (both people and places), email addresses, postcodes (i.e. particular formats of alphanumeric characters, explained in detail later), Zip codes, telephone numbers, timestamps, GPS coordinates, calendar schemes and uniform resource locators (URLs). In accordance with the present invention, each such template effectively constitutes a respective set of UIDs that the probe searches for amongst events and documents (collectively referred to as data items) within the computing environment. In other words, any character sequence which matches a template is deemed to be a UID. For example a sequence of numbers which is consistent with the UK National Telephone Numbering Plan will be deemed to be a UK telephone UID, and a character sequence which comprises a protocol known by its initial letters, e.g. http, https, ftp, followed by "://" followed by a host name (e.g. www.apa.org, or expressed in "dotted-decimal" form) will be deemed to be a URL UID.

The Establish Profile function of the Networker program generates a graphical user interface (GUI). This has a Profile tab and a Search tab.

The Profile tab enables the user to establish the configuration of his profile. Clicking on the Profile tab opens a ProfilePanel, which allows the user to select a default configuration from a number of preset configurations which are compatible with common desktop environments and employ categories of information including documents and those managed by a personal information manager such as Outlook, e.g. email messages, calendar entries, contact records, bookmarks; and also provides for the user to input his name, description and email address to be held in a root record of a hierarchical record tree to be constructed by the Networker program, as will be described later.

The ProfilePanel displays a plurality of ProfileGroup Panels with titles including People, Place, Event, Journey, On Offer, File, Search, Note, Bookmarks and Trail. Initially, the ProfileGroup Panels are in the closed state, but clicking on an OpenCloseBox of a ProfileGroup panel opens that ProfileGroup to display one or more ProfileGroup Rows. Each ProfileGroup Row contains a PermissionPanel having a Share check box defining whether or not the data items relating to that ProfileGroup Row are to be shared with anyone else, and other check boxes for selecting the extent of sharing from Everyone, Work, Home, Work Team.

The Search tab enables the user to set criteria for the search area and the user-defined software probes, e.g. the extent of the search area, the data items to be regarded as private, the selection of the pre-defined software probes, and to request the generation of a general-purpose software probe tailored in accordance with user-specified search parameters.

One preset configuration defines:

a search ruleset including the pre-defined software probes to be used, the extent of the search area within the computer environment—all stored data (documents, email messages, calendar entries, contact records, bookmarks) and all transient features of the computing environment (web browsing—web page viewing records), and the search type (automatic and continuous monitoring of the computer environment);

a publish ruleset establishing a public and private sections, including bookmarks, browsing and documents (in a variant, there is only a public section and anything not specified by the public section is deemed to be private);

a disclosure ruleset specifying the identities of other users who are permitted to access the user's published data items, whether those other users are to be authenticated by a password, and whether an alert is displayed for the user when a data item is accessed by such a permitted user; and a retrieval ruleset for finding published data items on other computers of the network which contain the same UID as a data item found by the search ruleset.

In an example of Networker, suppose that users at computer 1 of the network use a browser to download pages over the Internet. In known manner, for each web page that is viewed by a user, a respective web page viewing record, constituting a data item of the present invention, is stored on his computer 1. This web page viewing record contains in known manner, inter alia, the user's ID, the URL of the page and the start and stop times of viewing. Suppose that the user has, assigned "Public" status to their web page viewing records.

A "URL" software probe is operative to scan all the data items stored on a user's computer 1, when the probe scans a web page viewing record it finds the URL, captures both the URL and the address of that web page viewing record on the user's computer 1. This data is passed to the Networker program which then constructs a tree record comprising the URL, now constituting a publication UID (UIDp), in association with the address, now constituting an association UID (UIDa), and adds that newly created tree record to the Browsing Container of the hierarchical tree.

The Browsing Container is associated with a ruleset which includes permission for the record to be published to the network. So, the Networker program will then invoke a publishing process which will create in the modified SWAN network by the SWAN updating process a new node having the URL (and the network address of that web page viewing record), and the common ID lists will be updated for any existing nodes having that URL as their ID.

According top a preferred embodiment the primary network that defines neighbourhood is a graph constructed specifically for the purpose of propagating read events. The network is a bipartite graph composed by links between users and articles and is not limited to the topology of the underlying physical network.

There are a number of known techniques which can be employed to measure the similarity of two users' interests, given a set of documents which both have accessed. One well-known approach is to use the Dice coefficient. For each pair of users, the Dice coefficient is calculated, giving a measure between 0 and 1 of how similar their interests are. For two users Ui and Uj, the Dice coefficient is given by:

$$2*|Ui \sqcap Uj|/|Ui|+|Uj|$$

where |X| is the number of documents which X has read and X☐Y is the set of documents which X and Y have both read. Alternatives are the Jaccard coefficient:

$$|Ui \sqcap Uj|/|Ui|+|Uj|-|Ui \sqcap Uj|$$

Or the cosine coefficient:

$$|Ui \sqcap Uj|/\sqrt{|Ui|*|Uj|}$$

Where some more fine-grained measure of the user's interest in particular documents (e.g. the number of times a given document has been read) is available, the Dice coefficient can be made more sophisticated:

$$2*\Sigma(Wij*Wik)/[\Sigma Wij^2 + Wik^2]$$

where Wxy is the number of times User y read Document x. The other coefficients can be similarly modified.

The system improves on earlier networks by informing a user about relevant or potentially interesting information that the user would not normally pick up as the sources of this information are not accessed by users who are closest neighbours, e.g. in the social web constructed by SWAN, i.e. are not within the user's "horizon". Closest neighbours are defined as users directly connected in a shared-context network.

The system incorporates means for recording information on articles accessed by each user and for sharing this information via messages with other users. The articles may include information as found in almost any electronic information source accessible via a network, including news feeds and web pages. A complementary facility supported by each user forwards messages containing information on accessed sources to other users. This forwarding takes place between closest peers in the social web.

The term "peer" comes from the field of "peer-to-peer" networks. These are networks designed with the aim that any node (or peer) is able to initiate or complete any supported transaction with any other node although in practice, a nodes ability to participate will be contingent on a number of things, such as the resources which the node has (cpu, storage, memory, network bandwidth) and its network visibility. A goal in peer-to-peer networks is that the resources of all clients can be used.

The forwarding of these messages is probabilistic and is regulated or filtered by each computer discarding a proportion of received messages without forwarding them. Messages for discarding may be selected at random or the proportion of messages discarded may depend on factors, such as network topology, e.g. how many peers the user has.

If the user has a very large number of peers (which could result, for example, if the user was fond of very popular news feeds) the user would be unlikely to be able to support the processing load associated with communicating with the very large number of users and the network would be similarly unlikely to be able to handle the volumes of traffic that such comprehensive communication would generate. Hence, such a user would be unlikely to maintain a link to any but a small proportion, typically selected at random, of the potential peers.

The filtering will naturally tend to suppress information from users more distant in the shared-context network. This is desirable as distance in the shared-context network equates to a divergence of interests. This tendency is counterbalanced by the popularity of a source, in that the more users who report accessing a source, the more likely it is that messages relating to that source will reach users located at greater distances from the users who have accessed it.

Figure 6:
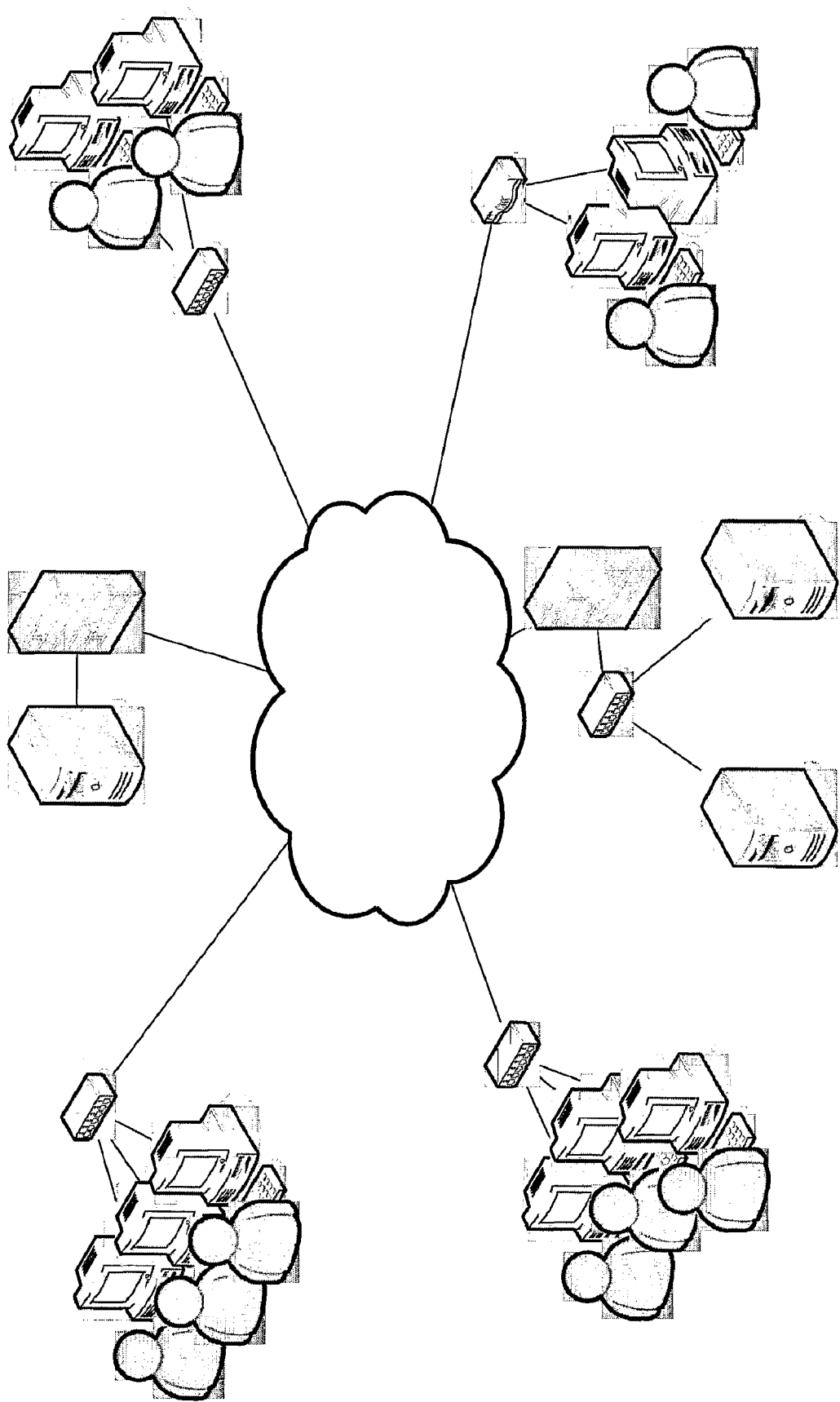
FIG. 6 shows a physical network suitable for implementing the present invention.

FIG. 6 shows the topology of a physical network of users, personal computers 12 and servers. This is referred to as a physical network in that the connections shown are representative of the physical interconnection of computers, routers and other network devices. The servers are used to hold and publish articles, accessed by the users, using the personal computers. The diagram shows users at four separate geographic locations, with messages being sent to the different locations via an inter-connected network, see cloud. The physical network is built using routers, firewalls and other network devices (not shown).

Figure 7:
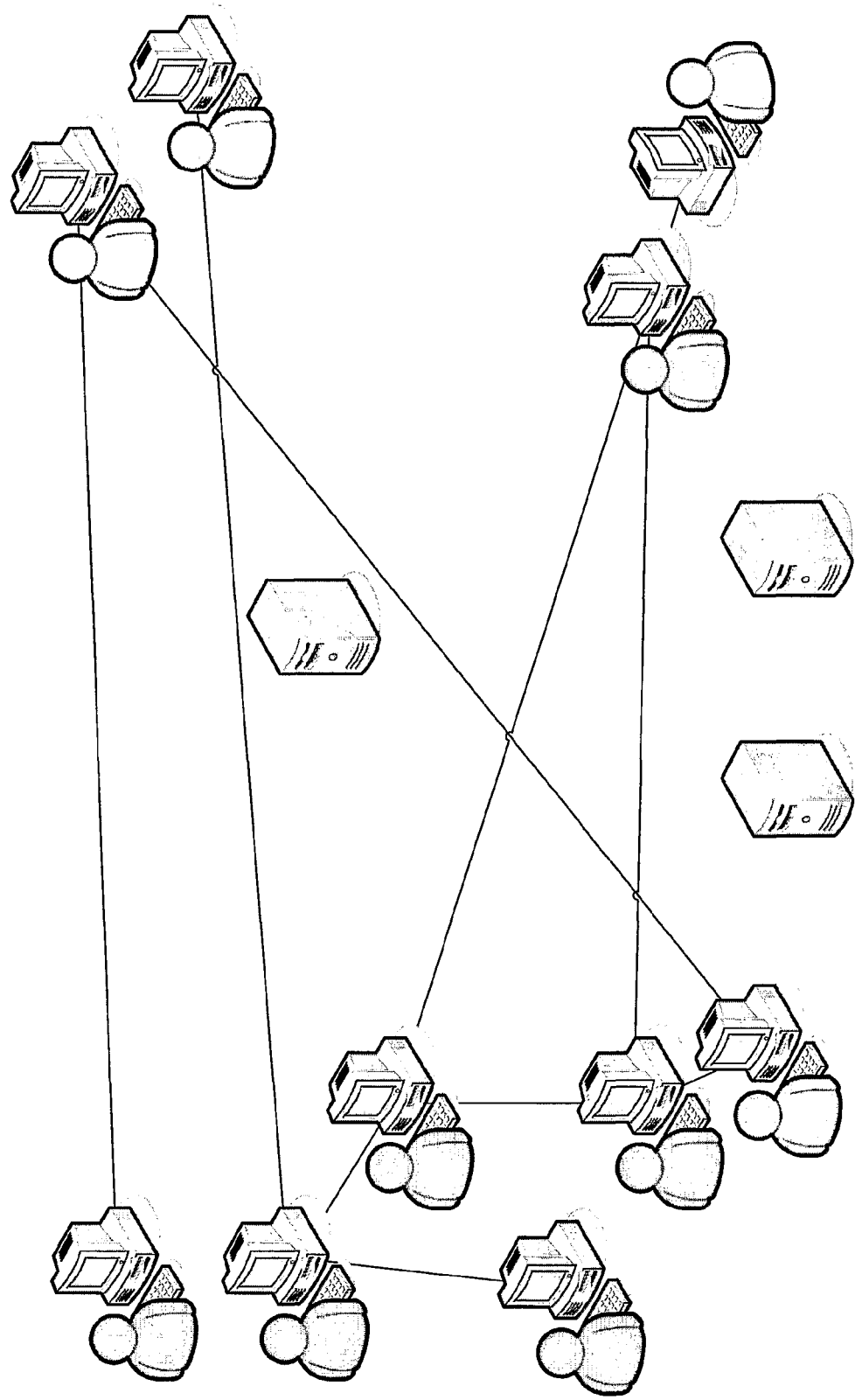
FIGS. 7 to 10 show aspects of networks according to the present invention.

FIG. 7 shows the topology of a peer-to-peer network. The network of FIG. 7 shows the same sets of computers as in FIG. 6 but the topology is different as proximity in this network is not defined with reference purely to geographic factors: the proximity of a one peer to another is defined by the algorithms used to discover neighbouring peers. The topology will change as peers connect or disconnect from the network.

Figure 8:
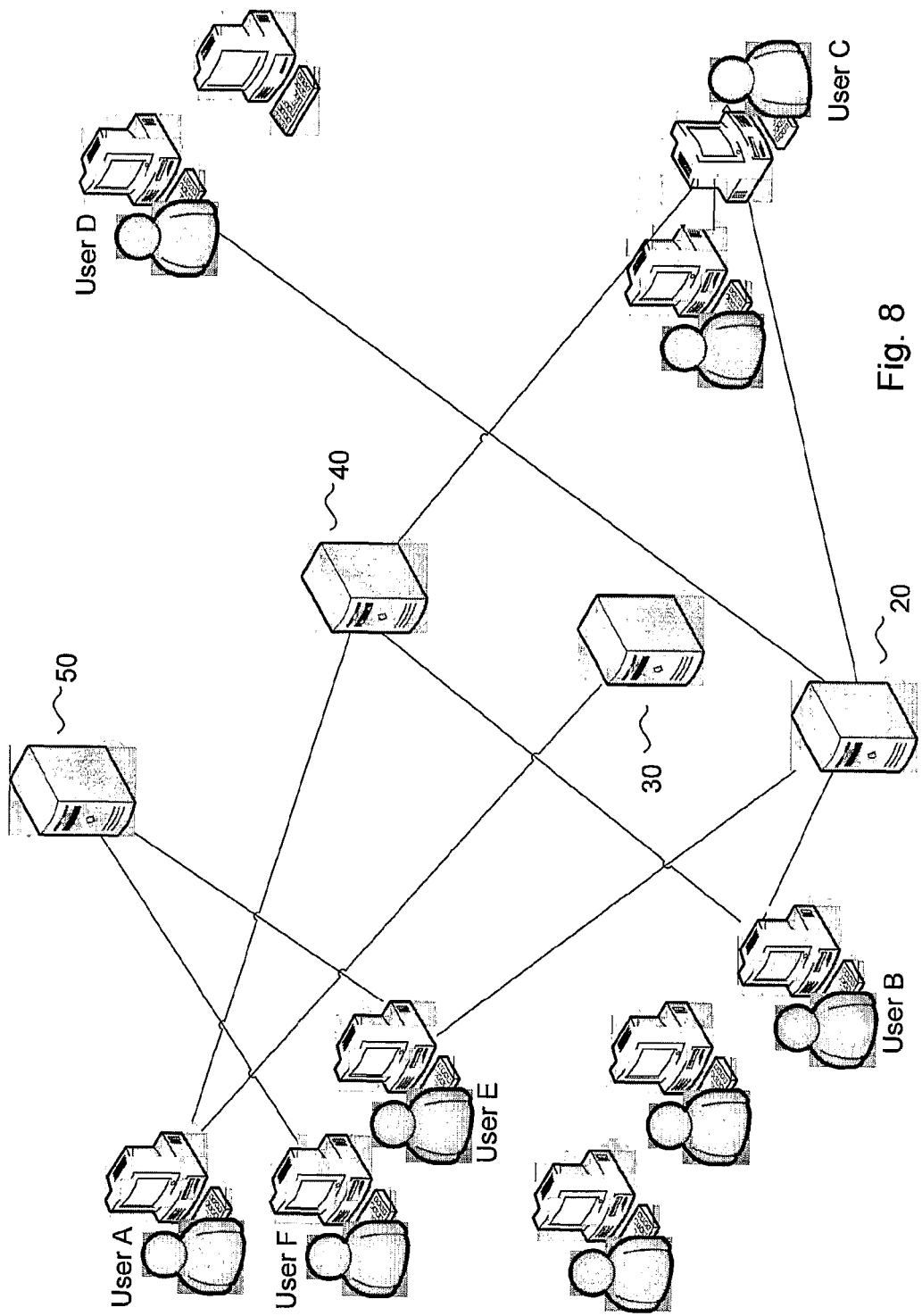

FIG. 8 shows the information sources, located on the various servers within the network that users can access. Server 20 is used to support information sources 5, 6 and 7; server 30 is used to support information source 9; and server 40 is used to support information sources 1, 2, 3 and 4. This diagram introduces a fourth information server 50, which is used to support information source 8. These information sources may be of various kinds, including individual web pages and RSS news feeds. The crucial aspect of the information source is that it has a unique name, and that unique name allows the information source to be identified to any of the users within the network.

In the network of FIG. 8, the following shows the pattern of accesses:

User A has accessed information sources 1, 2, 3, 4 and 9;
User B has accessed information sources 2, 3, 4, 7 and 8;
User C has accessed information sources 4, 5, 6 and 7;
User D has accessed information sources 5 and 6;
User E has accessed information sources 6 and 8;
User F has only accessed information source 8.

Here the information source may, by way of example, be a particular news fees or web site. Alternatively, the pattern may be one based on accesses to individual pieces of information, such as a particular story in a news feed or a specific page on a web site.

Figure 9:
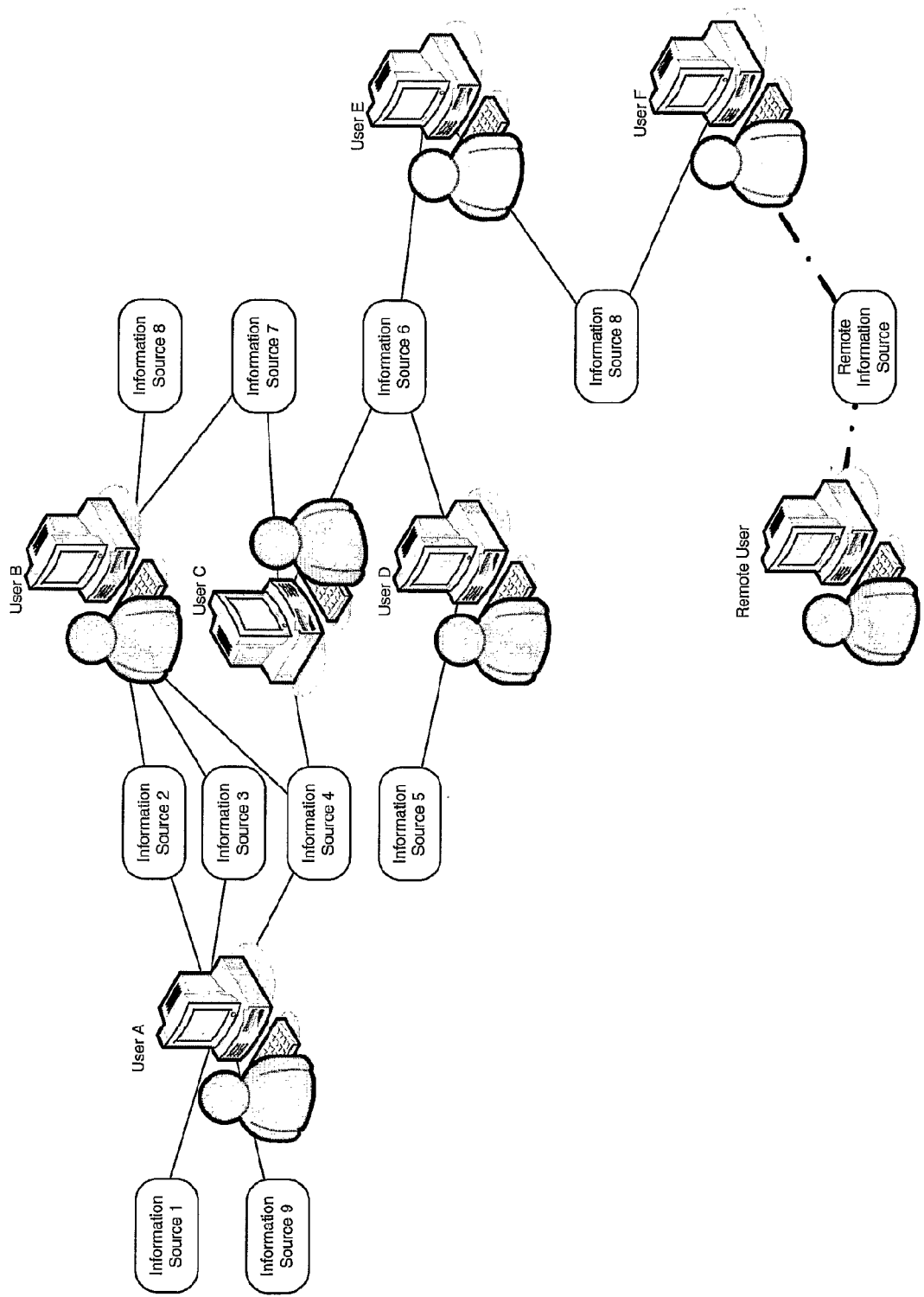

Using a peer-to-peer technology, such as that described above, which generates a distributed hash table, it is possible to automatically generate a network topology as shown in FIG. 9. Distributed hash tables form the basis of a number of peer-to-peer systems such a SWAN, DIET and Chord, see "Chord: A Scalable Peer-to-peer Lookup Service for Internet Applications", Stoica, Morris, Karger, Kaashoek, Balakrishnan, SIGCOMM'01, Aug. 27-31, 2001, San Diego, Calif., USA.; http://www.pdos.lcs.mit.edu/papers/chord:sigcomm01/chord_sigcomm.pdf As mentioned above, the basis of the network is the fact that the articles or information sources have unique names (such as http://www.bt.com/index.html or http://www-.knowledgeboard.com/include/xml_rss2_syndicated1.xml).

The network of FIG. 9 is defined in terms of vertices and edges where the vertices represent the computers, and the edges represent the articles or information sources that have been accessed by one or more of the users associated with the computers.

Figure 10:
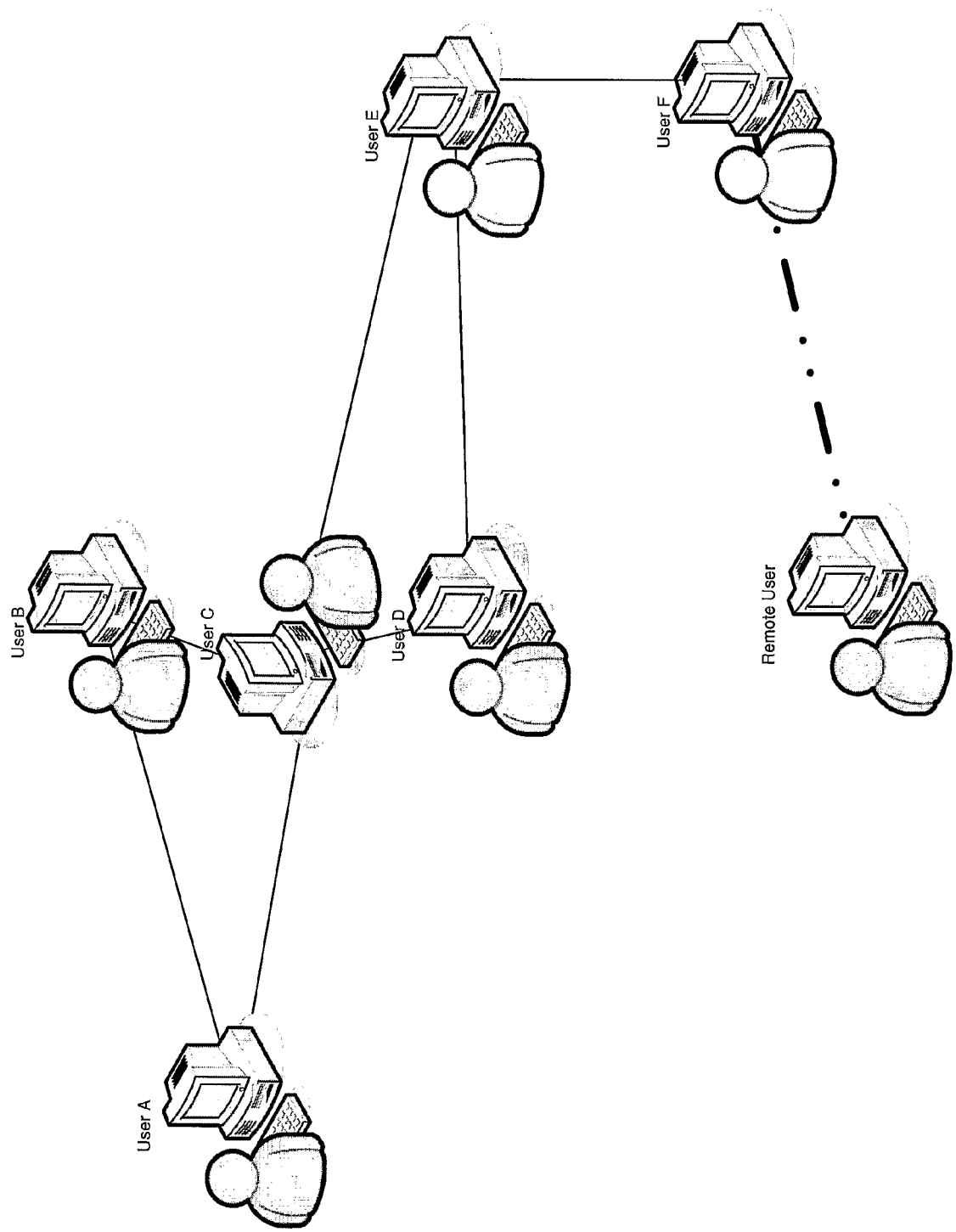

FIG. 10 shows the topology of the network used to propagate messages. In the network of FIG. 10, each user is shown with a direct connection to each other user who has accessed an article or information source accessed by that user. In FIG. 10, User A has a direct link to user B and C, user B has a direct link to user A and C, user C has a direct link to user B, D and E, user D has a direct link to user C and E, user E has a direct link to user C, D and F and user F has a direct link to user E and to a remote user. The network of FIG. 10 is a network of shared context, in which the system detects the contexts in which a user embeds itself (e.g. through accesses carried out in the user's computing environment) and is able to create and maintain links with other users who share that context. This network is automatically generated on behalf of the users by software. The shared-context network does not require judgements on or representations of the meanings of the information accessed.

Any one of the users can subscribe to a new article or information source. This will result in a change to the network and will then start the propagation of information on the availability of this source to potentially all of the enrolled users.

As described above, with reference to the Networker invention, the system incorporates means for recording information on articles or information sources (news feeds, web pages, etc) accessed by each user and for sharing this information via messages with other users. A complementary facility supported by each computer forwards messages containing information on accessed sources to other users. This forwarding takes place between peers, i.e. users directly connected via a link, in the shared-context network of FIG. 10.

According to a preferred embodiment, the forwarding of these messages is probabilistic and is regulated or filtered by each node discarding a proportion of received messages without forwarding them.

Furthermore, the network of FIG. 10 will evolve based upon the reading habits of the members. For example, the computers will only record for a finite period that an article or information source has been read. The length of this period will vary depending on the context in which the network is set up but could typically be of the order of a month. This finite persistence of a recorded event ensures that the network evolves to reflect the current reading patterns, rather than representing a full historic overview.

Reducing the number of links maintained by the software, to readers of popular items.

A user might not establish a link to all other users with a common interest. The proportion of the possible links established will depend on factors, such as network topology, e.g. how many peers the user has. If the user has a very large number of peers (which could result, for example, if the user was fond of very popular news feeds) it would be likely to discard a high proportion of messages in order to avoid flooding the network. Although the description often refers to the users taking various actions, it will be evident to the skilled reader that it is software running on the user's computer that is carrying out the tasks for the user.

The filtering function takes various network parameters such as number of readers (of an articles or information source) and network size. This function returns a number between 0 and 1. Separately, a random number is generated, between 0 and 1 and, if that number is less than the number returned by the function, the message is propagated to the neighboring peer; otherwise, the message is not forwarded.

The invention advantageously provides users with information about relevant or potentially interesting articles or information sources that they would not be aware of otherwise. It achieves this in an efficient way without generating excessive network traffic and operates in the background without requiring any intervention on the part of the user, once the required software is installed. As a result, the user is provided with a list of sources that may be of interest or relevant from which the user simply needs to choose which to access.

For example, maintaining a link with all other users who read an article on the BBC website is practically impossible. Consequently, instead of linking to all BBC users, you can link to only a sample of those BBC readers, but treat the events you receive as being a representative sample of all BBC readers. For example if there were a million readers of a BBC article, a user may only link to 100 such users, but an event received from one of those hundred, is treated as if one hundredth of all readers of that article had notified the user of the event.

Depending on the probability function being used, the fact that a BBC article was a popular node in the network may prejudice or promote propagation by a user of events received from those readers. The basic statistical technique of "roll an n-sided dice" would be suitable as propagation function. This would be neutral to whether a peer was identified from a popular article or a rarely read article.

Ordering of articles or information sources is inherently provided by the network described. Through operation of the event-propagation network described, each computer will receive a series of "read notification" messages. Often a single article or information source will be the subject of a number of such notifications due to large numbers of users accessing it. The number of read notifications received for any one article is an indicator of both relevance and popularity. The number of messages received for an article or information source is an indication of relevance by virtue of the attenuation of messages over distance in the shared-context network/ReadGraph space. The number of messages received for an article or information source is an indication of popularity in that it reflects the frequency of message generation. A simple ranking of all notified articles may be achieved according to the number of notifications received. For example, the article for which 100 read notifications are received might be at the top, the one for which 30 read notifications are received below that, and so on.

This information could advantageously be presented in terms of three "panes" or windows. The first pane would contain the items you were subscribed to (and therefore already knew about). The second pane would contain the items which your first order neighbourhood was reading. The third pane would contain the items which were being forwarded to you through the shared-context network/Read-Graph space. In each case, the notifications would be ordered by relevance according to frequency.

The weighting scheme is to show how an example algorithm could be used to rank the local articles or information sources, and display those articles or information sources in the "three pane" interface. The weighting scheme is specifically for the use within a peer-to-peer news reader.

In order to identify the peers in the shared-context network, it is necessary to rate users based on their behaviour. An example of a rating algorithm for a local user is as follows:
  a) Set the "importance" of each user (including local user) to 1
  b) For each other user, if that user has read at least one article the same as the local user, increase the "importance" of the user by 1
  c) For users scoring above a predetermined level, identify them as peers of the local user.

From the network of FIG. 9 an example calculation would proceed as follows:

Person A reads newsfeeds 1, 2, 3, 4, 5 and 9; Person B reads 2, 3, 4, 7 and 8; Person C reads 3, 4, 6 and 7; and Person D reads 5 and 6. The importance of each node is set at 1. B reads two articles in common with A: article A1 and A2 (from newsfeeds 2 and 3), so the importance of B is calculated as 3 (=1+2). Both A and C have read article A3, so the importance of C is set to 2. The importance of D is 1, as D has not read any of the same documents as A, even though both A and D subscribe to newsfeed 5.

This algorithm simply allows nodes with similar reading habits to be identified, and some measure of importance to be given to that similarity.

The filtering will naturally tend to suppress information from users more distant in the social web, as these messages will have to survive more filtering events than messages from closer users. This is a desirable outcome, as distance in the network of FIG. 10 equates to a divergence of interests and sources indicated in messages from more distant users would tend to relate to sources of less relevance than those from close neighbours. This tendency to filter out less relevant sources is counterbalanced by the popularity of a source, in that the more users who report accessing a particular source, the more likely it is that messages relating to that source will reach users, even those located at greater distances from the users who have accessed it.

In a further embodiment, the invention classifies articles read, and makes inferences about the wider topics that a user may be interested in. Inferences are made about the themes contained within RSS feeds.

A user's interaction with the system also helps to build a profile for the user: articles accessed and read result in the creation of new links and hence new proximities in the shared-context network. If any one of the peers subscribes to a new information source this addition to the network will then start the propagation of the availability of this source to potentially all of the enrolled peers.

According to a further embodiment, the invention may be implemented in a centralised arrangement based on a server. This has probes, identities and the definition of the shared-context network in common with Networker approach, except there is no decentralised lookup system. With a server, all records of items read by all users can be stored on one machine, and lookup takes place within indexes stored on the same machine. The probabilistic propagation (filtering) does not need to be executed by passing messages between machines on the network, but instead the "significance" of all read events for all users, and the ranking can be calculated by the server as if the events had been attenuated in a decentralised network. Filtering would still be based on distance between users over the context-sensitive network.

In the peer-to-peer embodiment, each user implements the software to record the reading habits of the individual user. The local user also implements routines to regularly poll peers for their reading histories. The local peer will fetch content from information sources, and present that information to the user.

In an alternative implementation, events are forwarded by users as they are received (rather than peers polling for the events). This approach will either be more or less efficient, depending on the frequency of events, and the desired responsiveness of the application. For example, if events are forwarded in real time, this may improve the system for the purposes of breaking news (e.g. natural disasters), whilst if events are passed on only when polled, this may improve the system's efficiency for less time-sensitive announcements, such as the release of a new Intel chip (typically telegraphed months earlier). In either case the message format could be identical to that described above. Alternatively, and to take best network efficiency advantage of the real-time forwarding alternative, UDP packets containing hashed encodings of identifiers for the information sources could be sent. Each packet sent would indicate a single read act. This has the advantage of avoiding the link negotiation implied by socket setup (typically required to send a bytestream such as an XML document), and could permit more information to be sent around the network with less network traffic. UDP packets are extremely efficient fixed size 'frames' of bytes which are sent in a fire and forget fashion, without negotiating a session or dedicating a port to a pair-wise communication (a single port can be used to communicate with all your neighbours for example). They contain no additional information except the bytes absolutely required to express the information they carry (not as inefficient as XML).

In the server embodiment, the server follows a similar series of computations, but all of the reading histories are stored in the centralised database. This centralised approach could alternatively be implemented by a centralised news service where people can not only read or subscribe to information services, but also are able to submit new sources.

The access of an information source is taken as the basis for looking up and presenting links to the user in the context of that web page. For the purpose of this invention the only information that needs to be collected is the fact that a user has read a particular piece of information and/or is subscribed to a particular information source. However, the relevance of the page to the user can be further inferred by the collection of characteristic features such as the time spent looking at the page, whether it is the window in focus, and whether the mouse is moving.

The invention also has application to networks supporting new aggregators. A news aggregator is a piece of software or a remotely hosted service that periodically reads a set of news sources on behalf of a user, finds any new or updated information posted since the last visit, and displays any articles that it finds for the user to browse. A news aggregator can check RSS-enabled web pages. RSS is a format used to provide short descriptions of the content of a web page together with a link to the full version of the content. News aggregators are able to collate and present news items in the RSS format, as defined at http://en.wikipedia.org/wiki/RSS_(protocol), thus saving the user from having to repeatedly visit websites to check for new content. An application of the invention to news items and RSS feeds uses a modified news aggregator to collect the required information on user activity.

For application of the invention to web browsing, the information that a user has read a particular piece of information and/or is subscribed to a particular information source could be gathered through either a web-proxy (running on the user's computer or a server-based proxy) or a more sophisticated client such as Peruse as described in "Profiles—analysis and behaviour", Crossley M, Kings N J, Scott J R, BT Technology Journal, vol. 21, no. 1, January 2003.

An example of a suitable mechanism for communicating the collected information is to send out a notification in a structured XML message. The issue of anonymity is important in order to get users to agree to use the system. The contexts described in Networker can be used to encode and anonymise this information so that it can be sent in a fixed length UDP packet, and be easily validated by receivers whilst avoiding the security compromise of giving away who is reading what. A cryptographic hash function such as MD5 may be used to hash network identifiers, such as email or web addresses. Furthermore, use may be made of forward error coding (FEC) in order to prevent individuals from reconstructing the URI unless more than a certain number of notifications are received by them from independent parties.

For example, user A asks B, C and D about the information sources they have read; B, C and D each return, in a message, a list of newsfeeds subscribed to. As part of that same message, the peers also return information about the "transient" (remote) news groups, i.e. information received by the user's closest peers on articles or information sources accessed by more remote peers. As mentioned above, user A knows of the existence of articles or information sources, but is unable to determine who has actually read from that source.

Using the MD5 hash to encode the network, as shown in FIG. 5, it would be extremely difficult for an end user to determine what other users have been reading. The user will know, however, that a number of other users have read the same information source.

For example, if a peer reads http://cefn.com/?inventor, the MD5 hash code could be 1234567890. The peer enquires to its neighbours who have also read 123457890. Each one of those peers will return an XML message of the form

```
<?xml version="1.0" encoding="utf-8"?>
  <p2pnds version="1.0">
    <peer>
      <informationSource md5Hash="123457890"
dateLastRead="Tue, 22 Mar 2005 17:56:23 GMT"/>
      <informationSource md5Hash="245339900"
dateLastRead="Tue, 22 Mar 2005 17:42:32 GMT"/>
    </peer>
    <transients>
      <informationSource URI="http://blog.mathemagenic.com/rss.xml"
        dateLastRead="Tue, 22 Mar 2005 17:42:32 GMT"
readBy="2"/>
    </transients>
  </peer>
</p2pnds>
```

At some point any peer has the ability to access the original information source.

We have described how, in a shared-context network, for example, as proposed by the Networker program, you could create a recommender system by propagating 'read' events across the network, filtering them stochastically, as appropriate and ranking them according to receipt frequency. The use of SWAN is given by way of an example of a technology that implements a distributed hash table. This enables the automatic calculation and detection of peers, through the accessing of common articles or information sources.

The network deriving the identity space, the shared-context network and the physical network supporting the peer network can each have a different topology.

Once connected to a peer network, the invention will attempt to identify new or useful RSS feeds (or other information sources) that a user has not seen before, and to relate those new feeds to the feeds that a user currently subscribes. These suggested new feeds can then be incorporated into the user's set of subscribed information sources.

By analysis of the network structure, the invention makes inferences about the importance of articles or information sources in the local area. Interaction with the system makes additions to the shared-context network by building additional links that, in turn, change the paths which messages can follow.

The invention advantageously provides users with information about or relevant or potentially interesting articles that they would not be aware of otherwise. It achieves this in an efficient way without generating excessive network traffic and operates in the background without requiring any intervention on the part of the user. As a result, the user is provided with a list of sources that may be of interest or relevance from which the user simply needs to choose which to access.

What is claimed is:

1. A network comprising:
 a plurality of computers connected for communication with each other and for accessing information sources, wherein the networked computers comprise:
  (a) means to detect sources accessed by each computer,
  (b) means to identify computers exhibiting similar interests in the sources,
  (c) means to create links between computers identified as exhibiting similar interests in the sources, and
  (d) means to disseminate data on sources accessed by each computer to other computers via the links.

2. The network as claimed in claim 1 in which the data is disseminated in the form of messages, in which each computer comprises filter means for deciding whether to forward a received message or to discard it.

3. The network as claimed in claim 2 in which the filter means is arranged to discard messages according to a statistical rule.

4. The network as claimed in claim 3 in which the statistical rule implemented by a computer is influenced by the number of links to that computer.

5. The network as claimed in claim 1 in which the information source comprises a web page.

6. The network as claimed in claim 1 in which the information source comprises a news feed.

7. The network as claimed in claim 1 in which the computers identified as exhibiting similar interests in the sources comprise computers having accessed information from one or more particular information sources.

8. The network as claimed in claim 1 in which the computers identified as exhibiting similar interests in the sources comprise computers having downloaded information from one or more particular information sources.

9. The network as claimed in claim 1 in which the computers identified as exhibiting similar interests in the sources comprise computers having read information from one or more particular information sources.

10. The network as claimed in claim 1 in which the computers identified as exhibiting similar interests in the sources comprise computers having accessed information sources that share a measure of similarity above a specific threshold value.

11. The network as claimed in claim 1 comprising means to determine whether downloaded information has been read by the computer.

12. The network as claimed in claim 1 in which the information sources comprise at least one of a web site and a news feed.

13. A machine-implemented method of sharing data in a network, said method comprising use of a plurality of programmed computers connected in a network for access to each other and to information sources by configuring each of said computer for:
 recording data on information sources accessed by each computer;
 identifying computers exhibiting similar interests in the sources;
 creating links in the network between computers exhibiting similar interests; and
 disseminating the data on sources accessed by each computer to other of said computers via the links.

14. The method as claimed in claim 13 including disseminating the data in the form of messages, in which each computer decides whether to forward a received message or to discard it.

15. The method as claimed in claim 14 including discarding messages according to a statistical rule.

16. The method as claimed claim 15 in which the statistical rule implemented by a computer is influenced by the number of links to that computer.

17. The method as claimed in claim 13 including identifying computers exhibiting similar interests in the sources as those accessing information from one or more particular web pages.

18. The method as claimed in claim 13 including identifying computers exhibiting similar interests in the sources as those accessing information from one or more particular news feeds.

19. The method as claimed in claim 13 including identifying computers exhibiting similar interests in the sources as those subscribing to one or more particular news feeds.

20. The method as claimed in claim 13 including identifying computers exhibiting similar interests in the sources as those downloading similar information.

21. The method as claimed in claim 13 including identifying computers exhibiting similar interests in the sources as those accessing information sources sharing a measure of similarity above a specific threshold value.

22. The method as claimed in claim 13 in which accessing information includes reading the information.

23. The method as claimed in claim 13 including determining whether information downloaded to a computer has been read by the computer.

24. A computer-readable storage medium containing a computer program comprising instructions which, when executed on a computer, cause the computer to operate in accordance with the method of claim 13.

* * * * *